(12) United States Patent
Totsuka et al.

(10) Patent No.: US 11,514,905 B2
(45) Date of Patent: Nov. 29, 2022

(54) INFORMATION PROCESSING APPARATUS AND INFORMATION PROCESSING METHOD

(71) Applicant: SONY CORPORATION, Tokyo (JP)

(72) Inventors: Noriko Totsuka, Kanagawa (JP); Kazuya Tateishi, Tokyo (JP); Yuichiro Koyama, Tokyo (JP)

(73) Assignee: SONY CORPORATION, Tokyo (JP)

(*) Notice: Subject to any disclaimer, the term of this patent is extended or adjusted under 35 U.S.C. 154(b) by 144 days.

(21) Appl. No.: 16/758,034

(22) PCT Filed: Aug. 28, 2018

(86) PCT No.: PCT/JP2018/031657
§ 371 (c)(1),
(2) Date: Apr. 21, 2020

(87) PCT Pub. No.: WO2019/087546
PCT Pub. Date: May 9, 2019

(65) Prior Publication Data
US 2020/0320994 A1   Oct. 8, 2020

(30) Foreign Application Priority Data
Oct. 30, 2017   (JP) .............................. JP2017-209844

(51) Int. Cl.
*G10L 15/22*   (2006.01)
*G06F 3/16*   (2006.01)
*G10L 17/22*   (2013.01)

(52) U.S. Cl.
CPC .............. *G10L 15/22* (2013.01); *G06F 3/167* (2013.01); *G10L 17/22* (2013.01); *G10L 2015/223* (2013.01)

(58) Field of Classification Search
None
See application file for complete search history.

(56) References Cited

U.S. PATENT DOCUMENTS 9,723,085 B1 * 8/2017 Amberden ................ A61F 5/37
2013/0281110 A1 * 10/2013 Zelinka ................... H04W 4/20
455/456.1

(Continued)

FOREIGN PATENT DOCUMENTS

JP   2007-114537 A   5/2007
JP   2008-026621 A   2/2008

(Continued)

OTHER PUBLICATIONS

International Search Report and Written Opinion of PCT Application No. PCT/JP2018/031657, dated Nov. 27, 2018, 08 pages of ISRWO.

*Primary Examiner* — Jonathan C Kim
(74) *Attorney, Agent, or Firm* — Chip Law Group

(57) ABSTRACT

Provided is an information processing apparatus that has an utterance function or controls the utterance function. The information processing apparatus includes a sending unit that sends interactive information regarding a voice agent, a receiving unit that receives interactive information regarding another voice, and a control unit that controls an utterance timing of the voice agent on the basis of the interactive information regarding another voice agent received by the receiving unit. The control unit causes utterance by the voice agent to stand by on the basis of the interactive information received from another voice agent. Moreover, the control unit causes the interactive information to be continuously sent during the utterance by the voice agent and during interaction between the voice agent and a user.

21 Claims, 7 Drawing Sheets

(56) References Cited

U.S. PATENT DOCUMENTS

| | | | |
|---|---|---|---|
| 2014/0074483 A1* | 3/2014 | van Os | G10L 15/22 704/275 |
| 2014/0244712 A1* | 8/2014 | Walters | G06Q 10/10 709/202 |
| 2014/0282003 A1* | 9/2014 | Gruber | G06F 3/165 715/727 |
| 2014/0310002 A1* | 10/2014 | Nitz | G10L 15/1822 704/270.1 |
| 2016/0155443 A1* | 6/2016 | Khan | G06F 3/147 704/275 |
| 2016/0239547 A1* | 8/2016 | Lim | G06F 16/2358 |
| 2016/0260431 A1* | 9/2016 | Newendorp | G10L 15/32 |
| 2017/0025124 A1* | 1/2017 | Mixter | G10L 15/32 |
| 2018/0025727 A1* | 1/2018 | Kume | G10L 17/22 704/275 |
| 2018/0090145 A1* | 3/2018 | Kume | G10L 13/033 |
| 2018/0091651 A1* | 3/2018 | Slovacek | H04M 3/5175 |
| 2018/0190264 A1* | 7/2018 | Mixter | H04L 67/55 |
| 2018/0293273 A1* | 10/2018 | Qian | G06F 16/90332 |
| 2018/0336905 A1* | 11/2018 | Kim | G10L 17/22 |
| 2019/0272569 A1* | 9/2019 | Kanamoto | G05B 19/418 |
| 2019/0304451 A1* | 10/2019 | Sugiyama | G06F 3/16 |
| 2020/0013404 A1* | 1/2020 | Sugiyama | G06F 40/30 |
| 2020/0027455 A1* | 1/2020 | Sugiyama | G06F 3/16 |
| 2020/0320994 A1* | 10/2020 | Totsuka | G06F 3/167 |

FOREIGN PATENT DOCUMENTS

| | | |
|---|---|---|
| JP | 2009-065562 A | 3/2009 |
| JP | 2016-224393 A | 12/2016 |
| JP | 2018-013545 A | 1/2018 |

\* cited by examiner

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2018/031657 filed on Aug. 28, 2018, which claims priority benefit of Japanese Patent Application No. JP 2017-209844 filed in the Japan Patent Office on Oct. 30, 2017. Each of the above-referenced applications is hereby incorporated herein by reference in its entirety.

TECHNICAL FIELD

The technology disclosed in this specification relates to an information processing apparatus, which has an utterance function or controls the utterance function, and an information processing method.

BACKGROUND ART

In recent years, along with the development of voice recognition technology, machine learning technology, and the like, an increasing number of various electronic devices such as information devices and home appliances are equipped with an utterance function. An electronic device equipped with an utterance function interprets an utterance of a user to execute device manipulation instructed by voice, and gives voice guidance on a report on a status of the device, explanation of how to use the device, and the like. This type of utterance function is also called a "voice agent". Moreover, in the internet of things (IoT) devices, conventional input apparatuses such as a mouse and a keyboard are absent, and a user interface (UI) using voice information rather than text information has more potential.

A situation may occur, in which a plurality of voice agents exists in the same space such as an ordinary home or an office.

If the plurality of voice agents starts utterance at its independent timing, the utterances overlap with each other, and there is a problem that a user cannot distinguish what each voice agent has said. In addition, if another voice agent interrupts and blocks the interaction while the user is interacting with one voice agent, there is a problem that the user's sense of use is impaired.

Thus, there have been proposed a voice guidance output apparatus which compares the importance of voice guidance between devices before voice output and outputs voice in order of the importance (e.g., see Patent Document 1), and a voice output apparatus which analyzes ambient sound before or during utterance of a voice message and decides whether or not to utter a voice message on the basis of the importance of the utterance content (e.g., see Patent Document 2).

CITATION LIST

Patent Document

Patent Document 1: Japanese Patent Application Laid-Open No. 2007-114537
Patent Document 2: Japanese Patent Application Laid-Open No. 2009-65562

SUMMARY OF THE INVENTION

Problems to be Solved by the Invention

An object of the technology disclosed in this specification is to provide an information processing apparatus, which has an utterance function or controls the utterance function, and an information processing method.

Solutions to Problems

The technology disclosed in this specification has been made in light of the above problems, and a first aspect thereof is an information processing apparatus including:
a sending unit that sends interactive information regarding a voice agent;
a receiving unit that receives interactive information regarding another voice agent; and
a control unit that controls an utterance timing of the voice agent on the basis of the interactive information regarding another voice agent received by the receiving unit.

The control unit further controls to receive the interactive information regarding another voice agent before the voice agent starts utterance, and causes utterance by the voice agent to stand by on the basis of the interactive information received from another voice agent.

Moreover, the control unit causes the interactive information to be continuously sent during the utterance by the voice agent and during interaction between the voice agent and a user. For example, the control unit causes the interactive information to be sent when it is an utterance turn for the voice agent during the interaction between the voice agent and a user.

Furthermore, the control unit causes the utterance of the voice agent to start when the user has inputted a predetermined word into the voice agent, regardless of whether or not the interactive information has been received from another voice agent.

Further, the control unit randomly sets a standby time until the voice agent starts or resumes the utterance.

The interactive information includes at least one of information regarding the utterance of the voice agent or information regarding the interaction between the voice agent and the user. In addition, the interactive information may include at least one of utterance waiting information, cumulative interaction time information, or agent detailed information regarding the voice agent itself.

Moreover, a second aspect of the technology disclosed in the present specification is an information processing method including:
a receiving step of receiving interactive information regarding another voice agent;
a determination step of determining an utterance timing of a voice agent on the basis of the interactive information received from another voice agent; and
a sending step of sending the interactive information while the voice agent is uttering or interacting with a user.

Effects of the Invention

According to the technology disclosed in this specification, it is possible to provide an information processing apparatus, which has an utterance function or controls the utterance function, and an information processing method.

Note that the effects described in this specification are merely examples, and the effects of the present invention are not limited thereto. Moreover, in addition to the above effects, the present invention may further exert additional effects.

Still other objects, features and advantages of the technology disclosed in this specification will become apparent from a more detailed description based on the embodiments described later and the accompanying drawings.

MODE FOR CARRYING OUT THE INVENTION

Figure 1:
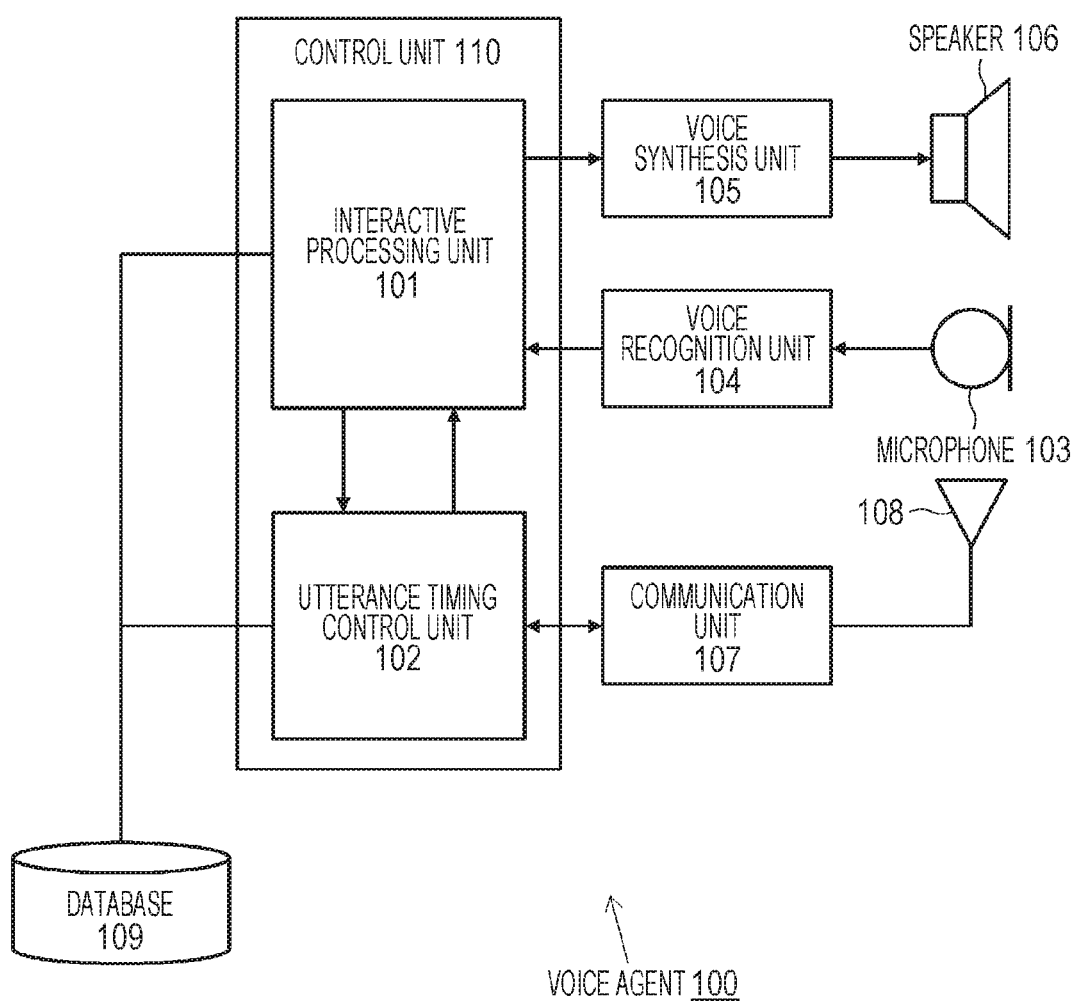
FIG. 1 is a diagram schematically showing a functional configuration of a voice agent 100.

Hereinafter, the embodiments of the technology disclosed in this specification will be described in detail with reference to the drawings.

An utterance function equipped in various electronic devices such as information devices and home appliances is also called a "voice agent". For example, the voice agent can also be defined as a function or a device which can be manipulated by voice recognition and supports the life of a user by voice for notification of or guidance on an alarm, schedule management and various information including news, weather forecast and the like. The voice agent also has a function of not only responding by voice to an utterance of the user, but also speaking to the user by itself.

As the spread of voice agents advances, a situation may occur, in which a plurality of voice agents exists in the same space. Under such a situation, if the plurality of voice agents starts utterance at its independent timing, the utterances overlap with each other, and there is a problem that the user cannot distinguish what each voice agent has said. In addition, if another voice agent interrupts and blocks the interaction while the user is interacting with one voice agent, there is a problem that the user's sense of use is impaired.

There have been proposed voice agents that compare the importance of voice messages therebetween to avoid overlapping of the utterances (e.g., see Patent Documents 1 and 2). However, if tasks handled by the voice agents are diverse and there are many types of messages, it is difficult to allocate the importance to each message, and the importance cannot be simply compared between the messages. For example, the voice agent is presumed to handle tasks such as weather checking, news, user schedule confirmation and music playback, but it is difficult to allocate the importance to each task.

In addition, it is presumed that the importance of each message changes over time. Accordingly, there is a concern over avoiding overlapping of the utterances with the fixed values of the importance that a really necessary message for the user cannot be delivered at the time point of the utterance. For example, the user wants to be notified of the weather immediately before going out but wants to be notified of the schedule one hour before the start of the schedule, such that the importance of the message cannot be hard-coded.

Furthermore, the voice agents proposed prior to this application presume only voice notification from the voice agents to the user, and interaction between the user and the voice agents is unexpected. Accordingly, there is a problem that overlapping with the interaction between the user and the voice agents cannot be avoided although overlapping of the utterances between the voice agents can be avoided. If another voice agent interrupts and blocks the interaction while the user is interacting with one voice agent, the user's sense of use is impaired.

Therefore, in this specification, an information processing apparatus equipped with an utterance function, which can avoid not only overlapping with utterance of another voice agent but also overlapping with interaction between a voice agent and a user, will be disclosed hereinafter.

A. System Configuration

FIG. 1 schematically shows a functional configuration of a voice agent 100 according to one embodiment of the technology disclosed in this specification. The entity of the voice agent 100 is, for example, an information device, a home appliance or the like equipped with a voice agent function (or with a voice agent program installed).

Examples of the information device equipped with the voice agent include a multifunctional information terminal, such as a smartphone, and a personal computer (PC). Further, there are a variety of home appliances equipped with the voice agent, such as a television, an audio device, a refrigerator, a microwave, a washing machine and an air conditioner.

Hereinafter, unless otherwise specified, another voice agent existing in the same space as the voice agent 100 has a similar functional configuration and is equipped with a similar utterance timing control function.

An interactive processing unit 101 is an interaction engine that realizes natural conversation with a user or another voice agent. Specifically, the utterance content of the user or another voice agent, which is picked up by a microphone 103, is recognized in voice by a voice recognition unit 104, and the interactive processing unit 101 generates its own next utterance content on the basis of the voice recognition result. Then, a voice synthesis unit 105 synthesizes a voice signal in accordance with the utterance content generated by the interactive processing unit 101, and the synthesized voice signal is outputted in voice from a speaker 106 to the user or another voice agent.

Note that the voice recognition unit 104 may subject a sneak signal from the speaker 106, which is included in the voice signal picked up by the microphone 103, to echo cancellation, but the detailed description will be omitted since this point is not directly related to the technology disclosed in this specification.

The interactive processing unit 101 may utilize a database 109, which accumulates the user's personal information and schedule, and various information necessary for utterance and interaction with the user, in order to realize natural conversation with the user and another voice agent. The database 109 may be equipped in a device that activates the voice agent 100, or may be built on a network that can be accessed by the voice agent 100.

The interactive processing unit 101 may also utilize, for example, an interaction engine having an artificial intelligence (AI) function. However, the technology disclosed in this specification is not limited to specific interactive processing so that the detailed description will be omitted.

A communication unit 107 sends and receives a wireless signal to and from another voice agent via an antenna 108. However, the communication unit 107 may communicate with another voice agent with wire instead of wirelessly. That is, communication between the voice agents is not limited to a communication medium or a specific communication standard.

An utterance timing control unit 102 autonomously controls the utterance timing of the voice agent 100 itself. In the present embodiment, the utterance timing control unit 102 controls the utterance timing of the voice agent 100 itself on the basis of information exchanged with another voice agent via the communication unit 107 or another transmission medium so that the utterance does not overlap with another voice agent. Another voice agent, which is a communication partner, also controls the utterance timing similarly.

Note that the functions of the interactive processing unit 101 and the utterance timing control unit 102 are, for example, implemented as software programs executed by a control unit 110 including a central processing processor (CPU), or the like in the information device.

In the present embodiment, the main feature of the utterance timing control unit 102 is to perform the following processing (1) to (3) in order to avoid overlapping with the utterance of another voice agent and interruption of interaction between the user and another voice agent.

(1) Sending Information Regarding Its Own Utterance and Interaction (2) Collecting Information Regarding Utterance and Interaction of Surrounding Voice Agents (3) Controlling Utterance Timing Based On Collected Information (1) Sending Information Regarding its Own Utterance and Interaction The utterance timing control unit 102 sends, to other surrounding voice agent via the communication unit 107, information indicating that the voice agent 100 itself is uttering or interacting with the user (hereinafter, also referred to as "interactive information"). The utterance timing control unit 102 decides not only whether the voice agent 100 itself is uttering in the interactive processing unit 101 but also whether the voice agent 100 is interacting with the user, and then sends the interactive information. It is preferable to send the information by using a method that does not impair the user's sense of use. However, the method of sending the interactive information will be described later.

(2) Collecting Information on Utterance and Interaction of Surrounding Voice Agents Moreover, the utterance timing control unit 102 receives and collects interactive information sent from other surrounding voice agents via the communication unit 107.

(3) Controlling Utterance Timing Based on Collected Information

Then, on the basis of the interactive information collected from the surrounding voice agents, the utterance timing control unit 102 controls the utterance timing of the voice agent 100 itself while avoiding overlapping with the utterance of another voice agent and interruption of the interaction between the user and another voice agent.

The utterance timing control unit 102 basically starts utterance earlier or gives priority to the voice agent interacting with the user earlier so as to avoid overlapping of the utterances between the voice agents and interruption of the interaction with the user. Furthermore, in a case where overlapping with the utterance of another voice agent and interruption of the interaction between the user and another voice agent occur, the utterance timing control unit 102 instructs the interactive processing unit 101 to postpone or suspend the utterance of the voice agent 100 itself to stand by.

In a case where a plurality of voice agents, which performs equivalent utterance timing control, exists in the same space, each voice agent sends interactive information to report that the voice agent is uttering or interacting with the user (i.e., that no interruption should be made) while the voice agent itself is uttering and interacting with the user. Therefore, the voice agent can autonomously decide the utterance timing by collecting the interactive information sent from other surrounding voice agents before and during the utterance while avoiding overlapping of the utterances between the voice agents. Moreover, the interactive information sent from each voice agent indicates not only that the voice agent is uttering but also that the voice agent is interacting with the user. Thus, it is possible to prevent interruption of the interaction between the user and the voice agent.

Furthermore, according to the method for the voice agent to autonomously control the utterance timing on the basis of the interactive information collected from other surrounding voice agents, basically, the utterance starts earlier, or the utterance or interaction of the voice agent interacting with the user earlier has priority. Accordingly, the voice agent can appropriately control the utterance timing without utilizing information that cannot be simply compared, such as importance of tasks and messages. Further, since a plurality of voice agents existing in the same space can autonomously control the utterance timing on the basis of the interactive information from each other while avoiding overlapping of the utterances and interruption of the interaction, a device that decides (or unitarily manages) the utterance order of each voice agent is unnecessary.

Figure 2:
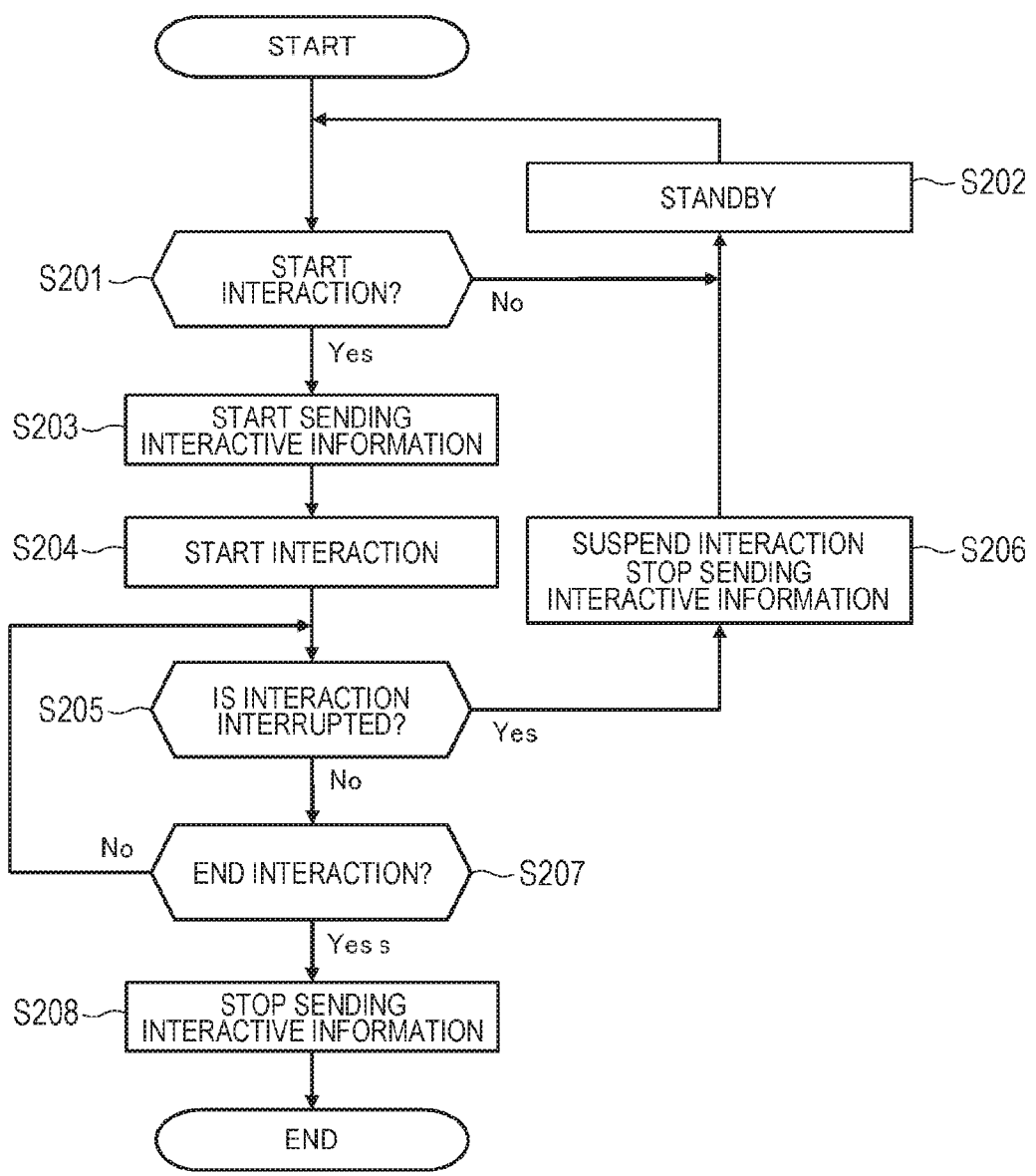
FIG. 2 is a flowchart showing a processing procedure for autonomously controlling the utterance timing in the voice agent 100.

FIG. 2 shows, in the form of a flowchart, a processing procedure for autonomously controlling the utterance timing in the voice agent 100. The illustrated processing procedure is basically performed mainly by the utterance timing control unit 102.

When an utterance trigger occurs in the interactive processing unit 101, the utterance timing control unit 102 discerns whether to start interaction with a user or utterance on the basis of the interactive information collected from the surrounding voice agents (Step S201).

The utterance trigger is arbitrary. For example, the interactive processing unit 101 causes the utterance trigger to occur on the basis of, for example, time information such as an alarm or a user schedule managed by the database 109. Moreover, the interactive processing unit 101 causes the utterance trigger to occur in response to that the user has inputted an activation word via the microphone 103. In addition, the interactive processing unit 101 may cause the utterance trigger to occur on the basis of information (e.g., emergency information such as news) inputted from the outside via the communication unit 107. Furthermore, the voice agent 100 may include various sensors (not shown in FIG. 1), and the interactive processing unit 101 may cause the utterance trigger to occur on the basis of sensor information detected by any of the sensors.

Then, when it has been found that another voice agent is currently uttering in the same space or that another voice agent is interacting with the user on the basis of the interactive information collected from the surrounding voice agents, the utterance timing control unit 102 determines that the voice agent 100 itself does not start utterance (No in Step S201). In this case, the utterance timing control unit 102 instructs the interactive processing unit 101 to postpone or suspend the utterance of the voice agent 100 itself to stand by (Step S202), and returns the processing to Step S201.

On the other hand, when it has been found that another voice agent is not currently uttering in the same space and that no voice agents are interacting with the user on the basis of the interactive information collected from the surrounding voice agents, the utterance timing control unit 102 determines that the voice agent 100 itself is allowed to start utterance (Yes in Step S201). In addition, in a case where it is clear that the interaction partner of the user has been switched to the voice agent 100 itself by the utterance of the interaction activation word from the user, predetermined user interface (UI) manipulation of the information device equipped with the voice agent 100, or the like even when another voice agent is uttering in the same space, the voice agent 100 may determine to start utterance, interrupting the interaction of another voice agent. Furthermore, also in a case of uttering important information related to the user's life and assets, such as emergency earthquake information, the voice agent 100 may determine to start utterance, interrupting the interaction of another voice agent.

In a case where the voice agent 100 itself has decided to start utterance (Yes in Step S201), the utterance timing control unit 102 starts sending the interactive information indicating that the voice agent 100 itself is uttering or interacting with the user (Step S203). While the voice agent 100 itself is uttering or interacting with the user, the interactive information is continued to be sent constantly or intermittently from the communication unit 107.

Then, the utterance timing control unit 102 permits the interactive processing unit 101 to utter, and thereby the interactive processing unit 101 starts utterance or interaction with the user (Step S204). Note that the utterance of the voice agent 100 includes the soliloquy of the voice agent 100 in addition to the interaction with the user.

When there has been interruption by other devices (other voice agents and the like existing in the vicinity) or interruption of the interaction has occurred within the voice agent 100 during the interaction of the voice agent 100, that is, while the interactive processing unit 101 is executing utterance processing or interaction processing with the user (Yes in Step S205), the utterance timing control unit 102 instructs the interactive processing unit 101 to suspend the utterance or the interaction with the user as well as stops sending the interactive information (Step S206). Then, the voice agent 100 stands by for the utterance until the utterance timing control unit 102 next instructs the start of the interaction (Step S202), and the processing returns to Step S201.

Note that what kind of event corresponds to the interruption of the interaction is arbitrary. For example, when the user, who is currently interacting with the voice agent 100, speaks to another voice agent, the voice agent 100 may allow the interruption of its own utterance on the basis of the recognition result of the user's voice and the interactive information that another voice agent has started to send. By allowing the interruption of the utterance on the basis of the interaction of the user, the user can designate a specific voice agent desired to explicitly switch the interaction partner, and the user's sense of use is improved.

Furthermore, the utterance timing control unit 102 checks whether or to cause the interactive processing unit 101 to end the utterance of the voice agent 100 or the interaction with the user (Step S207).

What kind of event corresponds to the end of the interaction with the user is arbitrary. For example, in a case where the interactive processing unit 101 still has information desired to be continued to utter or in a case the answer from the user is predicted from the context of the interaction and the like, it is determined that the interaction with the user is continuing. In other cases, it is determined that the interaction has ended. Moreover, in a case where the user does not utter even after a predetermined time of standby, the interactive processing unit 101 may forcibly terminate the interaction with the user due to timeout.

When the interaction with the user has not yet been ended (No in Step S207), the processing returns to Step S205 to continue the utterance or the interaction with the user by the interactive processing unit 101, and the utterance timing control unit 102 continues sending the interactive information.

Further, when the interaction with the user has ended (Yes in Step S207), the utterance timing control unit 102 instructs the interactive processing unit 101 to end the utterance or the interaction with the user, stops sending the interactive information (Step S208), and ends the processing.

The voice agent 100 can avoid overlapping of the utterances between the voice agents and prevent interruption of the interaction between the user and another voice agent by executing the processing procedure shown in FIG. 2 in the space where the plurality of voice agents, which performs the equivalent utterance timing control, exists.

The voice agent 100 can avoid overlapping with the utterance of another voice agent and interruption of the interaction between the user and another voice agent in the space where the plurality of voice agents, which performs the equivalent utterance timing control, exists by collecting the interactive information sent from surrounding voice agents before and during the utterance of the voice agent 100.

The voice agent 100 decides the start or continuation of the utterance on the basis of the interactive information collected from the surrounding voice agents and the current state of the utterance or the interaction of the voice agent 100. Then, when the start of the utterance has been postponed or the utterance has been suspended, the voice agent 100 stands by for the utterance until it is decided that the next utterance is possible.

Furthermore, when the voice agent 100 starts the utterance or the interaction with the user in the space where the plurality of voices agents, which performs the equivalent utterance timing control, exists, the voice agent 100 sends the interactive information to prevent overlapping with the utterances of the surrounding voice agents.

Basically, the voice agent that has started utterance earlier has priority. While the interactive information is being sent from one voice agent, other voice agents stand by for utterance in principle. As a result, the voice agent that has started utterance earlier has priority, and overlapping of the utterances can be avoided.

Furthermore, the voice agent 100 can prevent interruption of the utterance due to the surrounding voice agents by continuing sending the interactive information during the utterance or during the interaction with the user.

Each time the utterance ends, the voice agent 100 decides whether the interaction with the user has ended. For example, in a case where information desired to be continued to utter still remains or in a case the answer from the user is predicted from the context of the interaction and the like, it is decided that the interaction has not ended. Then, during a period when the interaction is continuing, the voice agent 100 continues sending the interactive information even when the voice agent 100 itself is not uttering, thereby suppressing interruption of the interaction due to surrounding voice agents to ensure a state in which the interaction can continue.

Note that the interactive information in the processing procedure shown in FIG. 2 may include a flag indicating that the interaction is being performed or simple information representing only ON/OFF information for the purpose of simply suppressing the utterances by other surrounding voice agents. However, the interactive information may include information for distinguishing the utterance of the voice agent itself from the utterance of the user and the like, and the details of this point will be described later.

B. Sending and Receiving Interactive Information between Voice Agents

Next, a mechanism for sending and receiving the interactive information between the voice agents existing in the same space will be described.

During a period when the interaction between the user and one voice agent is continuing, that voice agent continuously sends the interactive information when the utterance is happening as a matter of course and even when the utterances of the user and the voice agent pause. It is preferable to send and receive the interactive information by using a method that does not impair the user's sense of use.

It is desirable that the voice agent can send the interactive information and receive the interactive information from another voice agent at the same time. If the voice agent cannot send the interactive information at the same time as receiving the interactive information, the chance of starting the interaction by the voice agent itself decreases. Moreover, if the voice agent cannot receive the interactive information at the same time as sending the interactive information, the voice agent cannot stop uttering even when the user wants to switch to another voice agent for interaction. Thus, the user's sense of use is reduced. Note that sending and receiving the interactive information "at the same time" also means sending of its own interactive information is performed in parallel with receiving of the interactive information from other voice agents, but does not necessarily mean full-duplex communication and includes alternate repetition of sending and receiving by time-sharing at short time intervals.

Furthermore, it is desirable that the voice agent can send and receive the interactive information at the same time as and in parallel with the utterance and the interaction with the user (i.e., the reproduction of the synthesized voice). The reason for this is because there is a possibility that the interaction is interrupted by other voice agents if sending the interactive information pauses during a period of the utterance or the interaction with the user. Another reason is that the user's sense of use will be greatly impaired if the utterance is suspended each time the interactive information is sent or received.

B-1. Method of Sending and Receiving Interactive Information

Next, a method of sending and receiving the interactive information by the voice agent will be described.

The voice agent may send and receive the interactive information, for example, by utilizing wireless communication. In this case, the utterance timing control unit 102 controls sending and receiving the interactive information via the communication unit 107 and the antenna 108. However, there is a concern for going through a network that a response delay may occur due to the influence of traffic conditions and the like. Therefore, the interactive information may be sent and received by direct communication between the voice agents.

Alternatively, the voice agent may send the interactive information by superimposing the interactive information on the synthesized voice reproduced from the speaker 106. In this case, the voice agent can separate and receive the interactive information from the voice signal picked up by the microphone 103. For example, by superimposing the interactive information on the inaudible band of the synthesized voice reproduced from the speaker 106, the voice agent can constantly send the interactive information without causing the user to listen to unpleasant sound even during the utterance of the voice agent itself.

If the voice agent sends interactive information during the interaction with the user so that the interactive information does not overlap with each other, it is possible to avoid overlapping with the utterance of another voice agent and interruption of the interaction between the user and another voice agent. Specifically, the voice agent continues sending the interactive information at a time when the voice agent itself utters (before the start of the utterance, during the utterance and after the utterance) and during a period of standby for the utterance from the user so that the voice agent is not interrupted by other voice agents.

The sending timing of the latter interactive information will be additionally described. In a case where the answer from the user is predicted as the result of the interactive processing even when the utterance from the user is not started immediately after the voice agent has ended its own utterance, the voice agent decides that the interaction is continued, and continues sending the interactive information. However, in a case where the user does not utter even after a predetermined time of standby, the interaction with the user is forcibly terminated due to timeout, and sending the interactive information is stopped.

Moreover, the voice agent performs receiving processing of the interactive information from other surrounding voice agents before the voice agent itself starts the utterance and at the timing of during the utterance to avoid interruption of the interaction between the user and another voice agent.

However, in a case where it is clear that the interaction partner of the user has been switched to the voice agent itself by the utterance of the interaction activation word from the user, performing predetermined UI manipulation on the information device equipped with the voice agent, or the like, the voice agent may promptly start the utterance without collecting the interactive information from other voice agents before the voice agent itself starts the utterance (or even when the interactive information on other voice agents has been received). At this time, even if another agent is interacting, the utterance can be started by interruption.

The format of the interactive information sent by the voice agents is arbitrary. For example, the interactive information may include various detailed information such as an identifier indicating the type of the interaction (or task) currently being performed with the user, device identification of the voice agent of the sending source, and user information for identifying the user who is the interaction partner. Furthermore, the interactive information may include information for distinguishing the utterance of the voice agent itself from the utterance of the user. Alternatively, the interactive information may be only a flag indicating that the interaction is currently being performed.

When the voice agent has received the interactive information from other voice agents before the voice agent itself starts the utterance, the voice agent recognizes that another voice agent is already interacting with the user, and postpones its own utterance to stand by to avoid overlapping of the utterances between the voice agents as well as to prevent interruption of the interaction between the user and another voice agent.

Further, in a case where the voice has received the interactive information from other voice agents and allows interruption of the interaction while the voice agent itself is uttering or interacting with the user, the voice agent suspends its own utterance to stand by to avoid overlapping of the utterances between the voice agents.

There are several patterns for setting the standby time when the voice agent has postponed or suspended its own utterance. In one pattern, the standby may be for a time randomly set at each time. If the standby time is set to a fixed value, there is a possibility that the utterances repeatedly conflict between the voice agents that have been standing by. Therefore, the conflict can be avoided by randomly setting the standby time. Moreover, in a different pattern, the voice agent may continue collecting the interactive information from other voice agents during the postponement of its own utterance to stand by until the end of the interaction of another voice agent is detected. The voice agent may set the standby time by using an appropriate pattern depending on the situation in which its own utterance of the voice agent has been postponed or suspended, or the like.

Further, there are several patterns for setting a time point of resuming the utterance when the voice agent suspends the utterance. The voice agent may resume the utterance from the time point of the suspension or may restart the utterance from the beginning. Alternatively, the utterance may be resumed from an intermediate time point between the beginning of the utterance and the time point of the suspension, without going back to the beginning. The voice agent may resume the utterance in an appropriate pattern depending on the utterance content (or the context of the interaction) or the like. Moreover, the voice agent may resume the utterance in an appropriate pattern depending on the situation in which the utterance has been suspended.

B-2. Sequence Example of Sending and Receiving Interactive Information (1)

Figure 3:
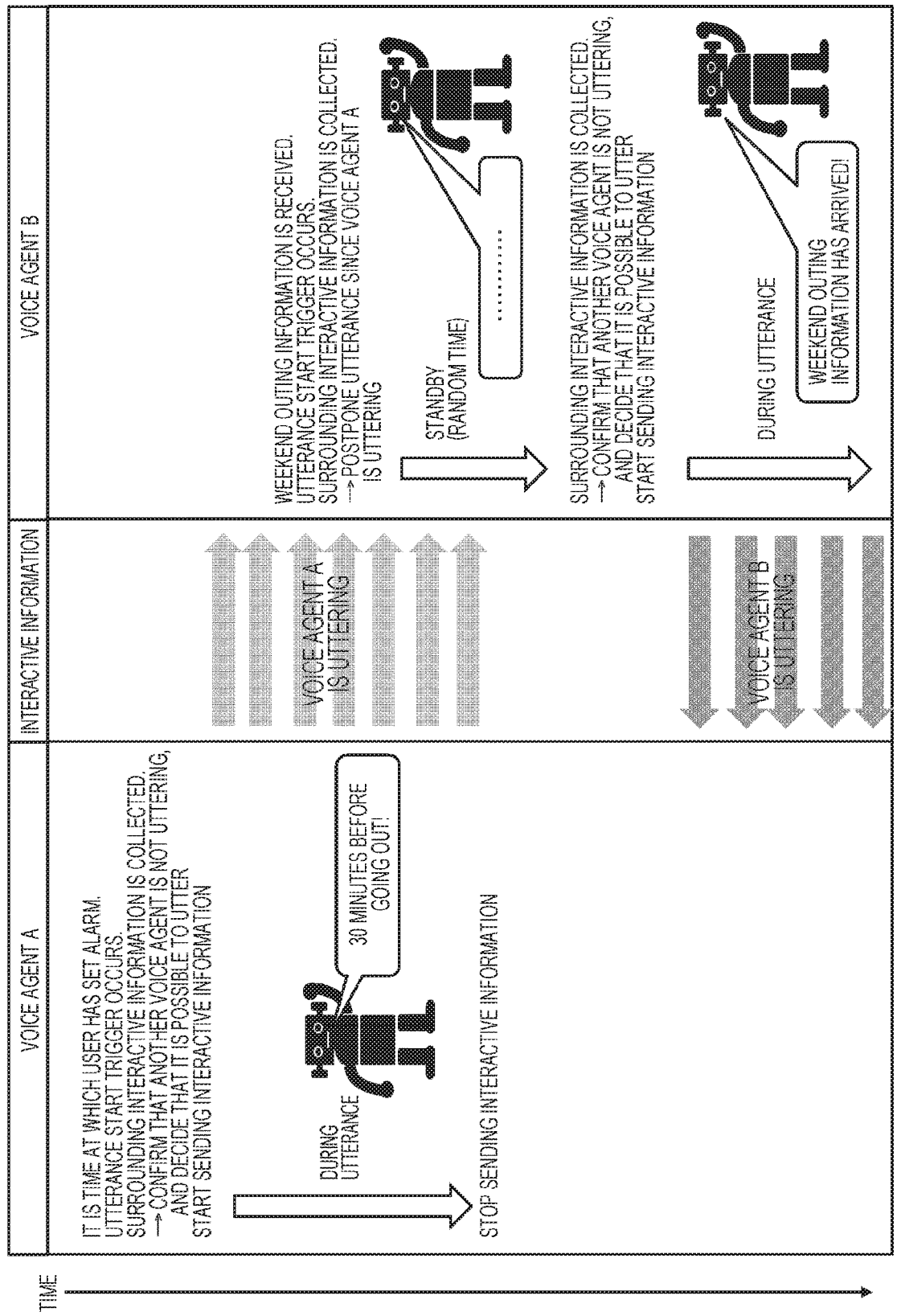
FIG. 3 is a diagram showing an example of an operation sequence in which a voice agent A and a voice agent B existing in the same space control the utterance timing.

FIG. 3 shows an example of an operation sequence in which a voice agents A and a voice agent B existing in the same space control the utterance timing. However, the illustrated example of the operation sequence does not include interaction between a user and any of the voice agent A and the voice agent B.

When it is the time at which the user has set the alarm, an utterance start trigger occurs in the voice agent A. Next, the voice agent A attempts to collect interactive information from other surrounding voice agents, but cannot receive the interactive information regarding another voice agent, and confirms that another voice agent is not uttering. Then, the voice agent A decides that the voice agent A itself can utter, and starts the utterance. In the illustrated example, the voice agent A has made an utterance with the contents of "30 minutes before going out!" Then, the voice agent A continues sending the interactive information during the utterance.

Meanwhile, when the voice agent B has received, for example, weekend outing information (on the user) from the outside, an utterance start trigger occurs. Next, the voice agent B attempts to collect interactive information from other surrounding voice agents, receives the interactive information regarding the other voice agents, and confirms that the voice agent A is uttering. Then, the voice agent B decides that the voice agent B itself cannot utter, and postpones the utterance. The voice agent B stands by, for example, for a random time.

Thereafter, when the utterance ends, the voice agent A stops sending the interactive information. On the other hand, after the random standby time has elapsed, the voice agent B again attempts to collect the interactive information from the other surrounding agents in order to start the utterance. At this time, sending the interactive information regarding the voice agent A is stopped. Thus, the voice agent B confirms that the voice agent A is not uttering, then the voice agent B decides that the voice agent B itself can utter, and starts the utterance. In the illustrated example, the voice agent B has made an utterance with the contents of "Weekend outing information has arrived!" Moreover, the voice agent B starts the utterance as well as starts sending the interactive information.

In the operation sequence shown in FIG. 3, the voice agent A and the voice agent B can utter while avoiding overlapping of the utterances between each other. Such an operation sequence can be realized by the voice agent A and the voice agent B both autonomously controlling the utterance timing in accordance with the processing procedure shown in FIG. 2, and a device for deciding the utterance order of each voice agent is unnecessary.

B-3. Sequence Example of Sending and Receiving Interactive Information (2)

Figure 4:
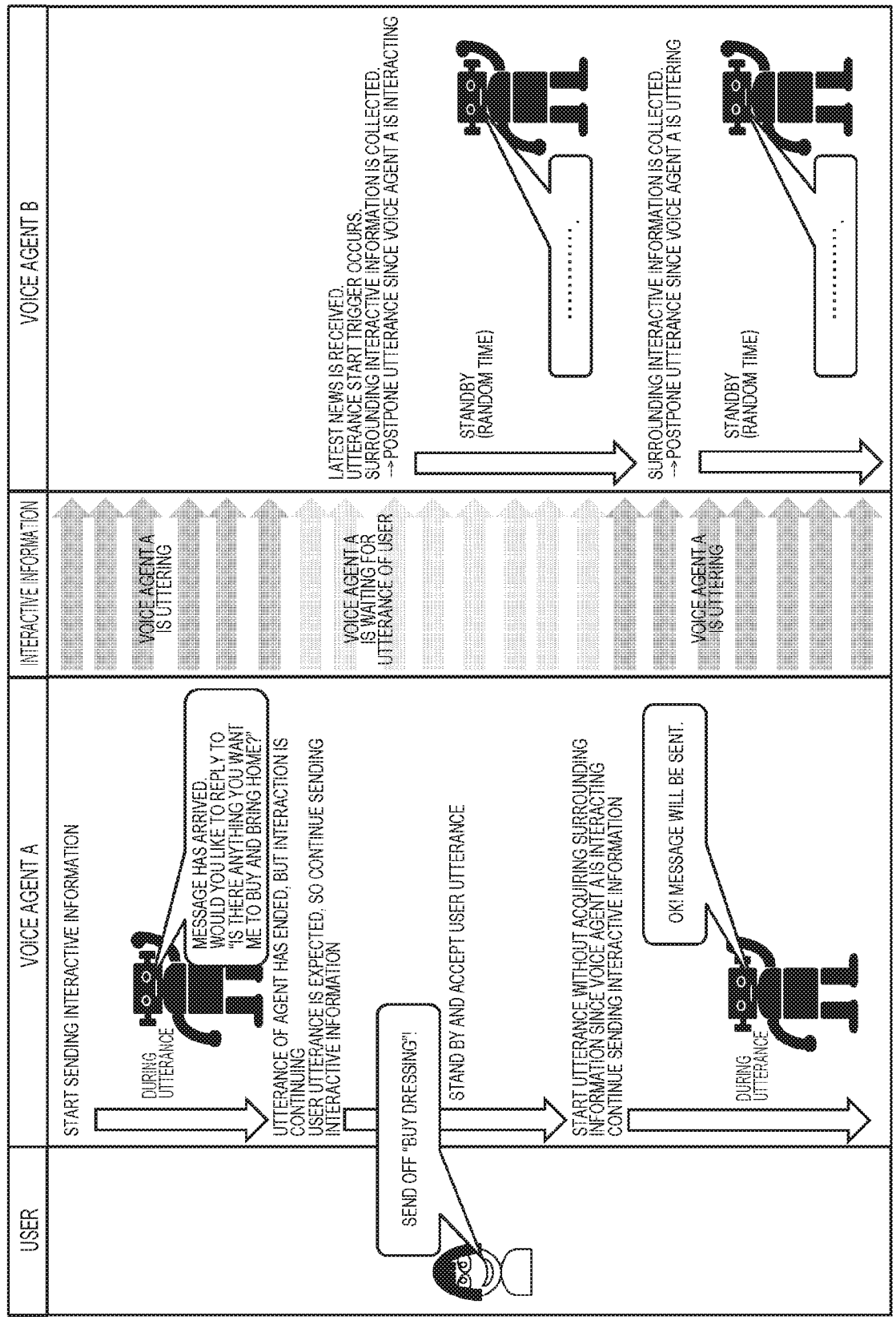
FIG. 4 is a diagram showing an example of the operation sequence in which the voice agent A and the voice agent B existing in the same space control the utterance timing.

FIG. 4 shows another example of the operation sequence in which the voice agent A and the voice agent B existing in the same space control the utterance timing. However, the illustrated example of the operation sequence does not include interaction between a user and at least any one of the voice agents.

When the voice agent A has received a message from a user who is outside, an utterance start trigger occurs. Next, the voice agent A attempts to collect interactive information from other surrounding voice agents. When the voice agent A cannot receive the interactive information regarding another voice agent and confirms that another voice agent is not uttering, the voice agent A decides that the voice agent A can utter, and starts sending interactive information as well as starts the utterance. In the illustrated example, the voice agent A has made an utterance with the contents of "A message has arrived. Would you like to reply to "Is there anything you want me to buy and bring home?" Note that the occurrence of an utterance start trigger and the collection of the interactive information in the voice agent A are omitted in FIG. 4. Then, the utterance of the voice agent A itself has ended, but the answer from the user is predicted from the context of the interaction or the like. Thus, the voice agent A continues sending the interactive information to stand by for the answer from the user as well as prevent interruption of the interaction from other voice agents.

Meanwhile, when the voice agent B has received, for example, the latest news from the outside, an utterance start trigger occurs. Next, the voice agent B attempts to collect interactive information from other surrounding voice agents. When the voice agent B confirms that the voice agent A is interacting with the user (is standing by for the utterance of the user), the voice agent B decides that the voice agent B itself cannot utter, postpones the utterance, and stands by for a random time.

Then, during a period when the voice agent A continues sending the interactive information and stands by for the answer from the user, the voice agent A accepts the utterance from the user with the contents of "Send off "buy a dressing!"". The voice agent A is interacting and continues sending the interactive information so that the utterance does not overlap with the other voice agents. Therefore, the voice agent A can directly utter the contents of "OK! The message will be sent." without receiving the interactive information (collecting surrounding information).

Meanwhile, after standing by for the random time, the voice agent B once again attempts to collect the interactive information from the other surrounding agents in order to start the utterance. After confirming that the voice agent A is uttering, the voice agent B decides that the voice agent B itself cannot utter, postpones the utterance again, and stands by for the random time.

In the operation sequence shown in FIG. 4, during the time the answer from the user is expected after the voice agent A has ended its own utterance, the voice agent A can continue the interaction between the voice agent A itself and the user while preventing interruption of the interaction by the voice agent B. Such an operation sequence can be realized by the voice agent A and the voice agent B both autonomously controlling the utterance timing in accordance with the processing procedure shown in FIG. 2, and a device for deciding the utterance order of each voice agent is unnecessary.

B-4. Sequence Example of Sending and Receiving Interactive Information (3)

Figure 5:
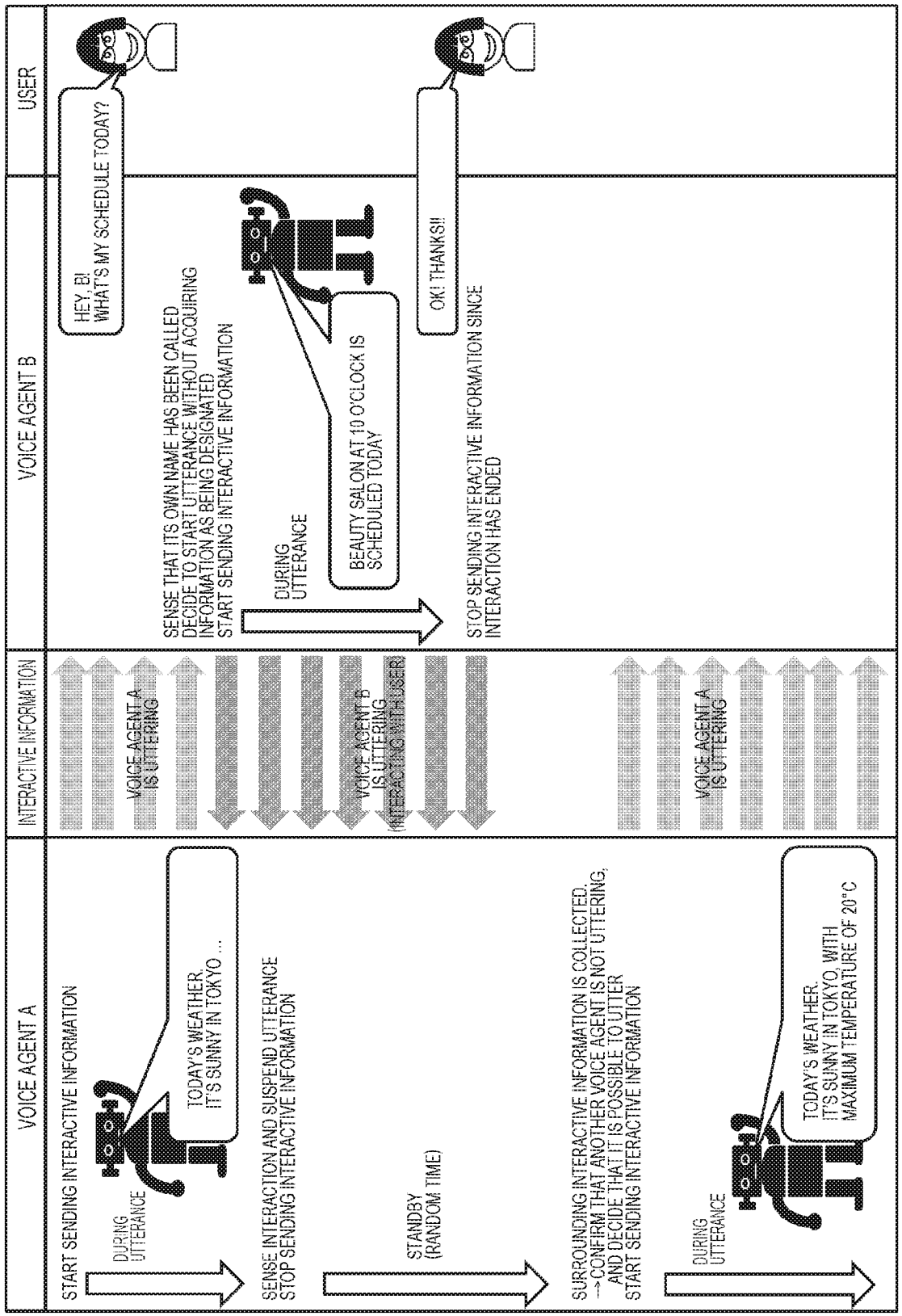
FIG. 5 is a diagram showing an example of the operation sequence in which the voice agent A and the voice agent B existing in the same space control the utterance timing.

FIG. 5 shows still another example of the operation sequence in which the voice agent A and the voice agent B existing in the same space control the utterance timing. However, the illustrated example of the operation sequence does not include interruption of the utterances of the voice agents due to another voice agent starting interaction with a user.

When it is a preset time, an utterance start trigger to notify of weather information occurs in the voice agent A. Next, the voice agent A attempts to collect interactive information from other surrounding voice agents. When the voice agent A confirms that another voice agent is not uttering, the voice agent A decides that the voice agent A itself can utter, and starts sending interactive information as well as starts the utterance. In the illustrated example, the voice agent A has made an utterance with the contents of "Today's weather. It's sunny in Tokyo . . . ".

Note that the occurrence of an utterance start trigger and the collection of the interactive information in the voice agent A are omitted in FIG. 5.

While the voice agent A is uttering, the user speaks to another voice agent B, "Hey, B! What's my schedule today?" When the voice agent B senses that the user has called its own name, in other words, that the user has uttered an interaction activation word, the voice agent B causes an utterance trigger to occur. Moreover, since it is clear that the interaction partner of the user has switched to the voice agent B, the voice agent B skips the reception of the interactive information (collection of surrounding information), directly interrupts the utterance of the voice agent A, and starts the utterance as well as starts sending interactive information. On the other hand, when the interruption of the utterance by the voice agent B is detected, the voice agent A suspends its own utterance, stops sending the interactive information, and stands by for a random time.

In the example shown in FIG. 5, the voice agent B has made an utterance with the contents of "Beauty salon at 10 o'clock is scheduled today". In response to this, the user has answered with the contents of "OK! Thanks!!" Since no further answer from the user is predicted from the context of the interaction or the like, the voice agent B determines that the interaction with the user has ended, and stops sending the interactive information.

The voice agent A stands by for the random time after the utterance has been suspended by the voice agent B, and then attempts to collect the interactive information from other surrounding voice agents in order to resume the suspended utterance. At this time, sending the interactive information regarding the voice agent B is stopped. Thus, the voice agent A decides that the voice agent A itself can utter, and resumes the suspended utterance as well as starts sending the interactive information.

There are several patterns for setting a time point of resuming the utterance of the voice agent A. The voice agent A may resume the utterance from the time point of the suspension or may restart the utterance from the beginning. In the example shown in FIG. 5, the voice agent A uses the pattern of restarting the utterance from the beginning and makes an utterance with the contents of "Today's weather. It's sunny in Tokyo, with the maximum temperature of 20° C.".

As in the example of the operation sequence shown in FIG. 5, each of the voice agents controls the utterance timing with emphasis on the continuation of the interaction with the user so that the user's sense of use is improved under an environment where the plurality of voice agents exists in the same space.

In the operation sequence shown in FIG. 5, the voice agent A and the voice agent B can avoid overlapping of the utterances between each other, and the voice agent B can interrupt the interaction and utter in accordance with the user's intention. Such an operation sequence can be realized by the voice agent A and the voice agent B both autonomously controlling the utterance timing in accordance with the processing procedure shown in FIG. 2, and a device for deciding the utterance order of each voice agent is unnecessary.

As can be seen from the example of the operation sequence shown in FIG. 5, the user can explicitly switch to the voice agent which becomes the interaction partner by designating a specific voice agent by an activation word, such as calling for a desired voice agent. That is, in an environment where the plurality of voice agents exists in the same space, each of the voice agent controls the utterance timing with emphasis on the partner interacting with the user so that the interruption of the utterance based on the interaction of the user is allowed. Thus, the user's sense of use is improved.

In a case where a plurality of voice agents utters simultaneously, the utterance of the voice agent which interacts with the user has priority. In the example of the operation sequence shown in FIG. 5, while the voice agent A is uttering, the voice agent B instantly responses to the utterance of its own activation word by the user and starts interaction, and the utterance of the voice agent A is suspended. Moreover, although not shown, when the user next utters the activation word for the voice agent A whose utterance is being suspended, the voice agent A instantly responds and starts interaction (or resumes the suspended utterance), and the utterance of the voice agent B is suspended.

Furthermore, in a case where a plurality of voice agents tries to start utterances at exactly the same timing in the same space, each of the voice agents sets its own random standby time so that the utterances do not repeatedly overlap.

For example, when the voice agent A and the voice agent B send the interactive information simultaneously or start the utterances, the interactive information is simultaneously received by each other, and the postponement or the suspension of the utterance occurs. Then, the voice agent A and the voice agent B set the respective standby times randomly. For example, the voice agent A has set a standby time of five seconds, while the voice agent B has set a standby time of three seconds. In this case, the voice agent B can return from the standby state to start or resume the utterance earlier. Further, when the standby time of the voice agent A has ended, the voice agent B has already started the utterance. By receiving the interactive information from the voice agent B, the voice agent A sets a random time again to stand by. Thereafter, the voice agent B ends the utterance and stops sending the interactive information. In addition, when the voice agent A returns from the standby state of the random time, the voice agent A can start the utterance by confirming that no interactive information is sent from the voice agent B.

C. Decision of End of Interaction by Voice Agent Next, a method of deciding the end of the interaction with the user by the voice agent will be described.

As can be seen from the processing procedure shown in the form of the flowchart in FIG. 2, when the voice agent decides that the interaction with the user has ended, the voice agent stops sending the interactive information. As a result, another voice agent existing in the same space can start the utterance or resume the suspended utterance.

It is important for the voice agent to accurately decide the end of the interaction in order to keep the user's sense of use. For example, if one voice agent interacting with the user decides that the interaction is not ended even though the interaction with the user has already ended, the voice agent continues sending the interactive information uselessly, and another voice agent existing in the same space cannot start the utterance. As a result, the user is exposed to a silent state where none of the voice agents utter, and cannot get service from any of the voice agents during that time, thereby reducing the user's sense of use. Conversely, if the voice agent in the interaction decides the end of the interaction without permission even though the user still has intention to continue the interaction, the interaction that user desired to continue is paused, and the sense of use is impaired. In addition, the user may feel inconvenience because the utterance is started from another undesired voice agent.

The voice agent can decide the end of the interaction with the user on the basis of information such as utterance content. For example, the voice agent assumes that the interaction has ended on the basis of the result of assuming the user's intention. Specifically, when the user has uttered a word with the contents for ending the interaction (or the contents indicating the closure of the interaction), such as "Thank you", "OK", "I'm good" or "that's all", the voice agent can decide the end of the interaction.

Alternatively, the voice agent itself may utter a word with the contents for ending the interaction (or with the contents indicating the closure of the interaction) to decide the end of the interaction with the user. For example, after providing all the information requested by the user, such as telling the tomorrow's weather, or after completing all the tasks requested by the user, such as registering the schedule of the user, the voice agent can decide the end of the interaction.

As described above, according to the method of deciding the end of the interaction on the basis of the utterance content, the voice agent can realize more natural (i.e., human-like) interaction.

Moreover, the voice agent may decide the end of the interaction on the basis of the time or the number of turns of the interaction with the user.

For example, the voice agent may decide the end of the interaction on the basis of the elapsed time from the start of the interaction with the user. Specifically, a rule is set in the voice agent in advance that one interaction ends within three minutes. When three minutes have elapsed from the start of the interaction with the user, the interaction with the user is forcibly terminated, and the end of the interaction is decided.

Alternatively, the voice agent may decide the end of the interaction on the basis of the number of times of interchange (the number of turns) with the user after the interaction has started. Specifically, a rule is set in the voice agent in advance that one interaction ends within three rounds of interexchange. When the interexchange reaches the three rounds after the start of the interaction with the user, the end of the interaction can be decided.

However, even if the interaction between the voice agent and the user has reached the preset interaction time or the upper limit of the number of turns, it is not always necessary to forcibly terminate the interaction with the user. Even after the interaction time or the upper limit of the number of turns has been reached, the voice agent may continue its own utterance until another voice utters, or allow interruption of the interaction by another voice agent. For example, after the interaction with the user has reached the interaction time or the upper limit of the number of turns, the voice agent may stop sending the interactive information and continue the interaction with the user.

The method of deciding the end of the interaction on the basis of the time or the number of turns of the interaction with the user in this manner is a simple rule and can be easily implemented in the voice agent. In addition, since the interaction between the user and a specific voice agent does not continue indefinitely, it becomes easy for each of a plurality of voice agents existing in the same space to obtain a chance to utter, and it becomes easy for the user to get various services from the plurality of voice agents.

D. Information Exchange between Voice Agents

In the present embodiment, a voice agent sends interactive information during utterance or during interaction with a user and postpones or suspends the utterance of the voice agent itself when interactive information from another voice agents is received before the start of the utterance or during the utterance. Thus, overlapping of the utterances is avoided, and interruption of the interaction is prevented. Therefore, in order for the user to interact with a specific voice agent without trouble, it is important to exchange information including the interactive information between the voice agents.

D-1. Information Exchange Method between Voice Agents

First, a method of exchanging information between voice agents will be described.

For example, information can be exchanged between voice agents by utilizing a network. For example, each of the voice agents may be connect to a wired local area network (LAN) or utilize wireless communication such as Wi-Fi (registered trademark). Information communication utilizing a network is highly versatile. In addition, accessing a wide area network such as the Internet enables connection from different spaces. However, there is a concern for going through a network that a response delay may occur due to the influence of traffic conditions and the like.

Alternatively, the voice agent may adopt a method of sending the interactive information by superimposing the interactive information on the synthesized voice reproduced from the speaker 106. In this case, the voice agent can separate and receive the interactive information from the voice signal picked up by the microphone 103. In this case, since the information can be exchanged at the same time as the utterance of the voice agent, the problem of the response delay does not occur. Moreover, by changing the frequency of the reproduced sound and the pattern of the signal, complicated information can also be expressed.

For example, an ultrasonic wave carrying the interactive information is reproduced from the speaker 106. Furthermore, the ultrasonic wave may be superimposed on the synthesized voice and reproduced from the speaker 106. By using an inaudible band such as an ultrasonic wave, the voice agent can constantly send the interactive information without causing the user to listen to unpleasant sound even during the utterance of the voice agent itself.

The information exchange method using a voice signal in an inaudible band such as an ultrasonic wave can be realized by using basic components of information devices and home appliances, which are equipped with a voice agent, such as a speaker and a microphone. Further, since the communication range is limited to a range in which a voice signal can be delivered, only voice agents existing in the same space can be the control targets. Further, the voice agent can send information carried by the voice to be uttered, and other voice agents can receive the information together with the reproduced sound of the synthesized voice. Thus, the response delay can be prevented.

Moreover, visible light communication or communication with invisible light such as infrared light as a medium can be utilized for the information exchange between the voice agents. To utilize this communication method, an information device or a home appliance equipped with the voice agent needs to be further equipped with a light emitting unit and a light receiving unit. By changing the frequency of the light emission and the pattern of the signal, complicated information can also be expressed. Furthermore, only a voice agent in a space to which an optical signal can be directly delivered can be the control target. Further, since the communication method does not pass through a network, the response delay can be prevented.

D-2. Contents of Information Exchanged between Voice Agents

The contents of the information exchanged between the voice agents existing in the same space will be described in more detail.

The voice agent sends and receives the interactive information to and from other voice agents existing in the same space, and controls each utterance timing. Accordingly, information essential for controlling the utterance timing should be included, and information useful for controlling the utterance timing should be further included in the interactive information.

The interactive information essential for the utterance timing control includes information regarding the utterance of the voice agent itself and information regarding the utterance of the user during the interaction. However, in this specification, the "interaction" is defined as that any one of the voice agent or the user starts utterance, and the other responds or is expected to respond thereto. According to this definition, the soliloquy of the voice agent is not regarded as the "interaction" even though the soliloquy is the "utterance". Moreover, as for the "utterance" of the voice agent, a phrase that the voice agent reproduces with the synthesized voice in the utterance turn of the voice agent is defined as one utterance.

In order to avoid overlapping of the utterance of another voice agent and the utterance of the voice agent itself as well as prevent interruption of the interaction between the voice agent itself and the user due to the utterance of another voice agent, the voice agent continues sending the interactive information including at least one of the above two pieces of information not only during the utterance turn of the voice agent itself but also during a period when the answer from the user is predicted.

Furthermore, the interactive information useful for the utterance timing control includes utterance waiting information, cumulative interaction time information, agent detailed information regarding the voice agent itself, and the like. The utterance waiting information referred herein is information indicating that the utterance of the voice agent has been postponed or suspended, and may additionally include the elapsed time since the postponement or the suspension. Further, the cumulative interaction time information is information regarding the cumulative time of the voice agent that has interacted with the user and is also information indicating how frequently the voice agent is used by the user. The agent detailed information includes identification information that can identify an individual, such as a name and ID of the voice agent, and attribute information that represents the character, role, and the like of the voice agent.

How to utilize the utterance waiting information, the cumulative interaction time information, the agent detailed information, and the like for the utterance timing control in the receiving-side voice agent is arbitrary. Furthermore, the size of the interactive information (i.e., what information should be included) should be decided in accordance with the bandwidth allocated to the transmission of the interactive information. The information included in the interactive information may be dynamically changed depending on the traffic situation.

D-3. Sending Procedure of Interactive Information

The voice agent sends the interactive information in order to avoid overlapping with the utterance of another voice agent and prevent interruption of the interaction during the utterance and during the interaction with the user. For example, during the interaction with the user, the voice agent may classify the information regarding the utterance of the voice agent itself and the information regarding the utterance of the user during the interaction and send and receive the information.

Figure 6:
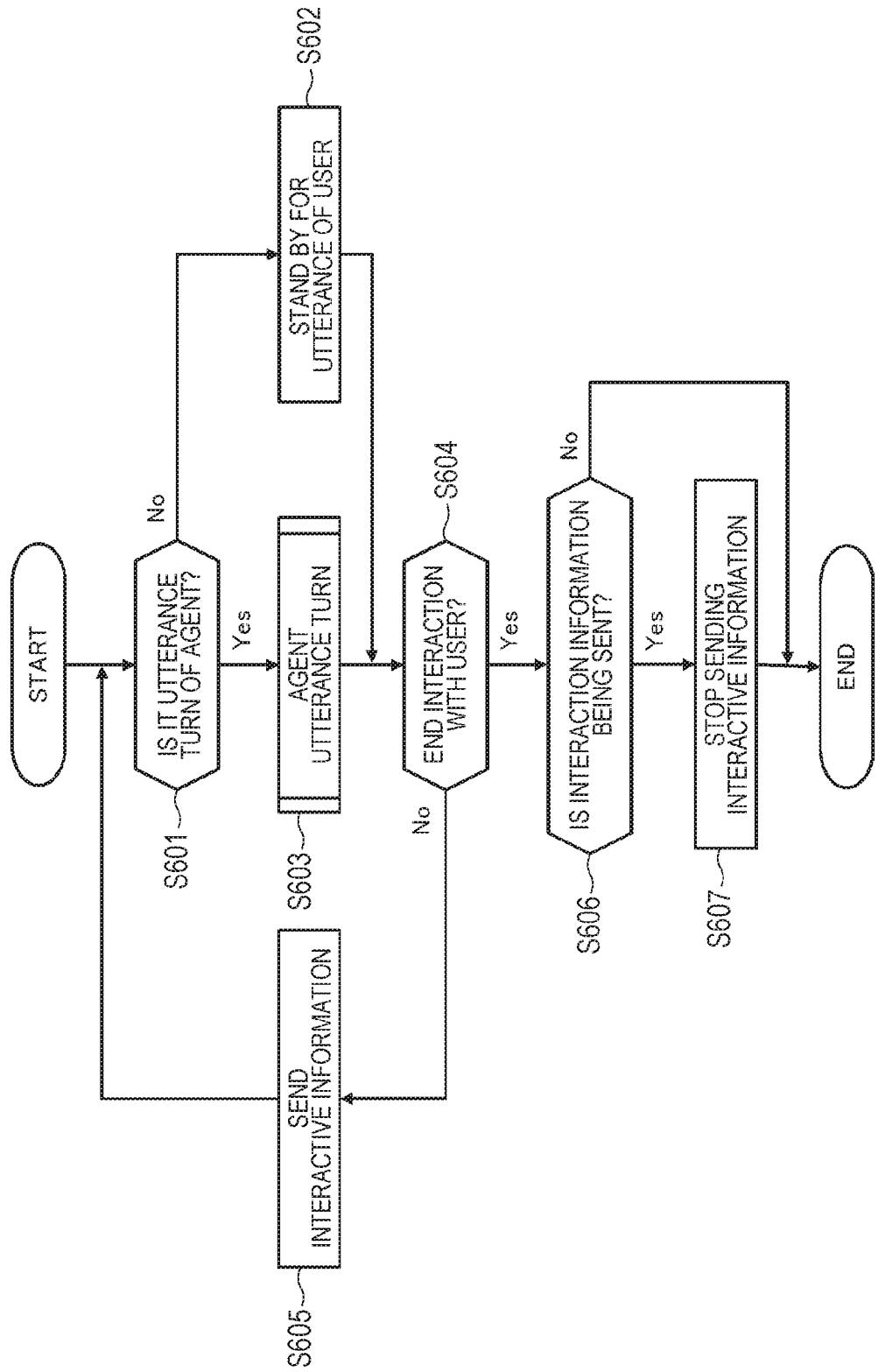
FIG. 6 is a flowchart showing a processing procedure for sending and receiving interactive information while a voice agent is interacting with a user.

FIG. 6 shows, in the form of a flowchart, a processing procedure for sending and receiving interactive information while a voice agent is interacting with a user. The voice agent referred herein basically corresponds to the voice agent 100 having the configuration shown in FIG. 1. In addition, the illustrated processing procedure is performed mainly by the utterance timing control unit 102 while the voice agent 100 is interacting with the user. It is also presumed that other voice agents that send and receive the interactive information have similar utterance timing control functions.

The utterance timing control unit 102 checks with the interactive processing unit 101 whether the utterance turn is for the voice agent 100 itself (Step S601).

In a case where it is not the utterance turn of the voice agent 100 itself (No in Step S601), the utterance timing control unit 102 instructs the interactive processing unit 101 to stand by for the utterance from the user by postponing or suspending the utterance of the voice agent 100 itself (Step S602).

Alternatively, in a case where it is the utterance turn of the voice agent 100 itself (Yes in Step S601), the utterance timing control unit 102 performs agent utterance turn processing (Step S603). The details of the agent utterance turn processing will be described later.

Then, when the agent utterance turn processing ends, the utterance timing control unit 102 checks whether to cause the interactive processing unit 101 to end the interaction with the user (Step S604).

What kind of event corresponds to the end of the interaction with the user is arbitrary. For example, in a case where the interactive processing unit 101 still has information desired to be continued to utter or in a case the answer from the user is predicted from the context of the interaction and the like, it is determined that the interaction with the user is continuing. In other cases, it can be determined that the interaction has ended. Moreover, in a case where the user does not utter even after a predetermined time of standby, the interactive processing unit 101 may forcibly terminate the interaction with the user due to timeout and end the interaction.

When the interaction with the user has not yet been ended (No in Step S604), the utterance timing control unit 102 sends the interactive information indicating that the interaction with the user is continuing (Step S605), and then returns the processing to Step S601 to stand by for the utterance turn of the voice agent 100 itself.

On the other hand, when the interaction with the user has ended (Yes in Step S604), the utterance timing control unit 102 further checks whether the interactive information is currently being sent (Step S606). When the interactive information is being sent, the utterance timing control unit 102 instructs to stop sending the interactive information (Step S607), and ends the processing. Alternatively, when the interactive information is not being sent, the utterance timing control unit 102 directly ends the processing.

Figure 7:
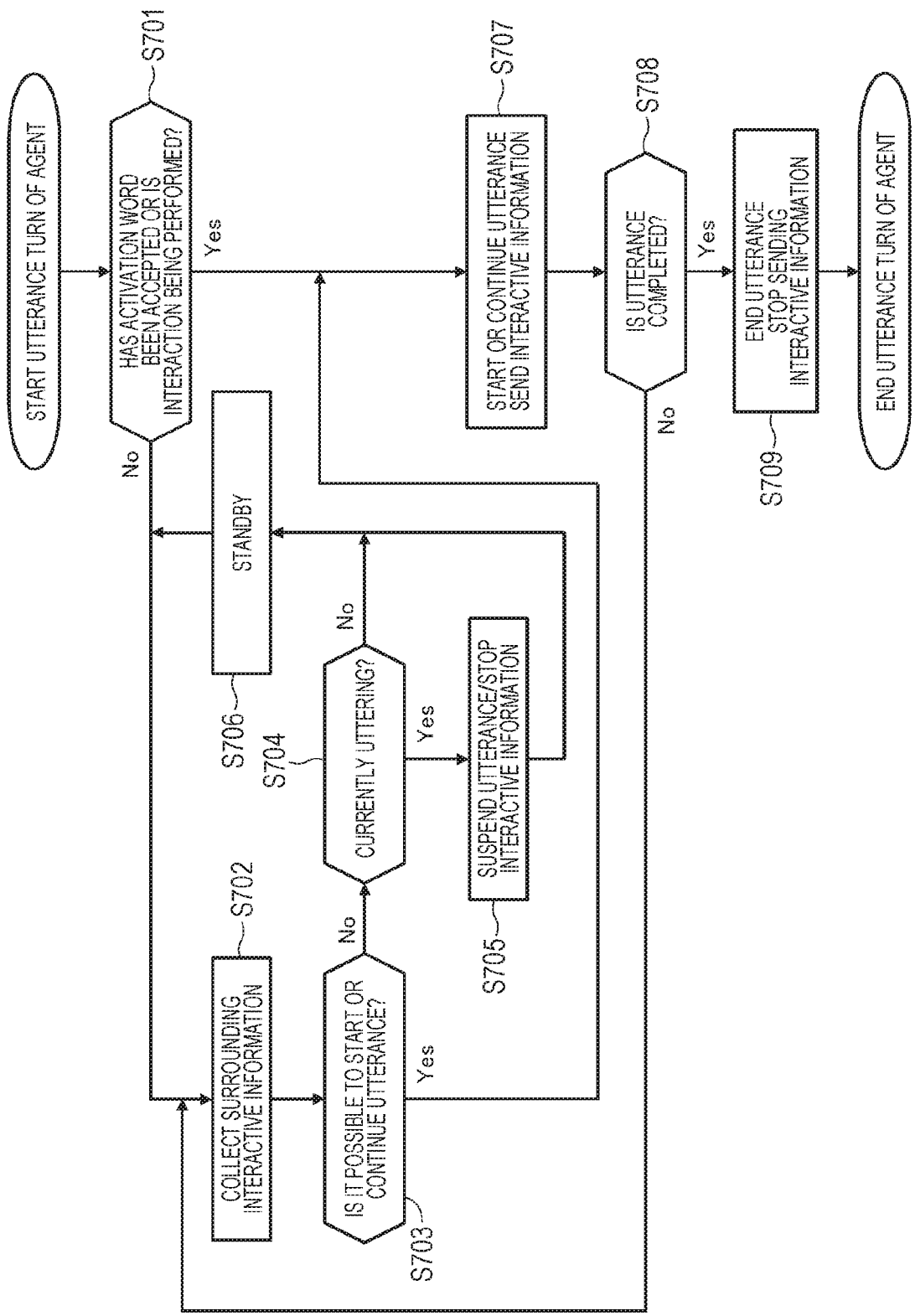
FIG. 7 is a flowchart showing a detailed processing procedure of the agent utterance turn processing.

FIG. 7 shows, in the form of a flowchart, a detailed processing procedure of the agent utterance turn processing executed by the voice agent 100 in Step S603 in the flowchart shown in FIG. 6. The illustrated processing procedure is performed mainly by the utterance timing control unit 102 while the voice agent 100 is interacting with the user.

First, the utterance timing control unit 102 confirms what was the trigger to start the utterance turn of the agent in the interactive processing unit 101. Specifically, the utterance timing control unit 102 confirms whether the activation word uttered by the user has been accepted or the interaction being performed with the user (Step S701).

Herein, in a case where the interactive processing unit 101 does not accept the activation word from the user and is not interacting with the user (No in Step S701), the utterance timing control unit 102 collects the interactive information from other surrounding voice agents (Step S702) to check whether the voice agent 100 itself may start or continue the utterance (Step S703).

When it has been decided that the voice agent 100 itself cannot start the utterance or that the interaction with the user cannot be continued due to interruption from another voice agent or the like on the basis of the interactive information collected from other surrounding voice agents (No in Step S703), the utterance timing control unit 102 further checks whether the voice agent 100 itself is currently uttering (Step S704).

Then, in a case where the voice agent 100 itself is currently uttering (Yes in Step S704), the utterance timing control unit 102 instructs the interactive processing unit 101 to suspend the utterance as well as stops sending the interactive information indicating that the voice agent 100 is uttering (Step S705) to stand by until it is possible to resume the utterance or the interaction with the user (Step S706).

Alternatively, in a case where the voice agent 100 itself is not currently uttering (No in Step S704), the utterance timing control unit 102 directly shifts to the standby state (Step S706).

On the other hand, in a case where the interactive processing unit 101 has accepted the activation word from the user or is interacting with the user (Yes in Step S701), the utterance timing control unit 102 instructs the interactive processing unit 101 to start or continue the utterance as well as sends the interactive information indicating that the voice agent 100 itself is uttering (Step S707).

Moreover, also in a case where it is decided from the surrounding information that the voice agent 100 may start or continue the utterance (Yes in Step S703) although the interactive processing unit 101 does not accept the activation word from the user and is not interacting with the user (No in Step S701), the utterance timing control unit 102 instructs the interactive processing unit 101 to start or continue the utterance as well as sends the interactive information indicating that the voice agent 100 itself is uttering (Step S707).

Then, until the utterance of the voice agent 100 itself ends (No in Step S708), the utterance timing control unit 102 collects the interactive information from the other surrounding voice agents (Step S702), checks whether the voice agent 100 itself may start or continue the utterance (Step S703), and repeatedly executes the processing similar to the above for continuing the utterance.

Thereafter, when the utterance of the voice agent 100 itself ends (Yes in Step S708), the utterance timing control unit 102 instructs the interactive processing unit 101 to end the utterance, stops sending the interactive information (Step S709), and ends the processing.

As described above, a voice agent to which the technology disclosed in this specification is applied basically starts utterance on first-come-first-served basis, regardless of the importance of tasks, messages, and the like. The voice agent that is uttering and interacting with the user continues sending the interactive information, and other surrounding voice agents postpone or suspend the utterances upon receiving the interaction information so as not to interrupt.

However, the voice agent has priority to start the utterance, interrupting the interaction of another voice agent even during the standby for the utterance when the voice agent has been explicitly designated as the interaction partner, such as when the user has inputted the interaction activation word or when the predetermined UI manipulation has been performed for an information device equipped with the voice agent. Accordingly, the user is not interrupted by another voice agent during the interaction with one voice agent. Thus, the sense of use is not impaired, and it is possible to switch to the interaction with another voice agent at any time according to the user's own intention.

INDUSTRIAL APPLICABILITY

The technology disclosed in this specification has been described above in detail with reference to specific embodiments. However, it is obvious that those skilled in the art can make modifications and substitutions of the embodiments in a scope without departing from the gist of the technology disclosed in this specification.

The technology disclosed in this specification can be applied to information devices and home appliances used in ordinary homes and offices, portable information terminals used outdoors and the like by the user, banking terminals such as ATMs, street terminals installed in public places, ticket vending machines at stations, copy machines and multifunction machines, and in-vehicle devices such as car navigation systems, and it is possible to suitably avoid overlapping of the utterances between the voice agents existing in the same space and overlapping with the interaction between the user and the voice agent.

In short, the technology disclosed in this specification has been described in the form of exemplification, and the contents of the description in this specification should not be interpreted strictly. To decide the gist of the technology disclosed in this specification, the scope of claims should be taken into consideration.

Note that the technology disclosed in this specification can also adopt the following configurations.

(1) An information processing apparatus including:
a sending unit that sends interactive information regarding a voice agent;
a receiving unit that receives interactive information regarding another voice agent; and
a control unit that controls an utterance timing of the voice agent on the basis of the interactive information regarding the another voice agent received by the receiving unit.

(2) The information processing apparatus according to (1), in which
the control unit further controls to receive the interactive information regarding the another voice agent before the voice agent starts utterance.

(3) The information processing apparatus according to (1) or (2), in which
the control unit causes the utterance by the voice agent to stand by on the basis of the interactive information received from the another voice agent.

(4) The information processing apparatus according to any one of (1) to (3), in which
the control unit further controls sending the interactive information from the sending unit.

(5) The information processing apparatus according to any one of (1) to (4), in which
the control unit causes the interactive information to be continuously sent during the utterance by the voice agent and during interaction between the voice agent and a user.

(5-1) The information processing apparatus according to (4), in which
the control unit causes the interactive information to be sent when it is an utterance turn for the voice agent during the interaction between the voice agent and a user.

(6) The information processing apparatus according to any one of (1) to (5), in which
the control unit decides whether the interaction between the voice agent and the user has ended, and causes the interactive information to be continuously sent when the control unit decides that the interaction has not ended.

(7) The information processing apparatus according to (6), in which
the control unit decides whether the interaction between the voice agent and the user has ended each time the utterance of the voice agent ends.

(7-1) The information processing apparatus according to (6), in which
the control unit decides the end of the interaction with the user on the basis of a time of the interaction with the user or the number of turns.

(8) The information processing apparatus according to any one of (1) to (7), in which sending of the interactive information is performed in parallel with receiving of the interactive information regarding the another voice agent.

(9) The information processing apparatus according to any one of (1) to (8), in which
sending of the interactive information is performed in parallel with the utterance of the voice agent.

(10) The information processing apparatus according to any one of (1) to (9), in which
the control unit controls the utterance timing of the voice agent in response to that the user has inputted a predetermined word into the voice agent.

(11) The information processing apparatus according to (10), in which
the control unit causes the utterance of the voice agent to start when the user has inputted the predetermined word into the voice agent, regardless of whether or not the interactive information has been received from the another voice agent.

(12) The information processing apparatus according to any one of (1) to (11), in which
the control unit causes the utterance of the voice agent to be suspended to stand by in response to that the interactive information has been received from the another voice agent.

(13) The information processing apparatus according to any one of (1) to (12), in which
the control unit randomly sets a standby time until the voice agent starts or resumes the utterance.

(14) The information processing apparatus according to any one of (1) to (13), in which
the control unit causes the utterance by the voice agent to stand by until the interactive information is no longer received from the another voice agent.

(15) The information processing apparatus according to any one of (1) to (14), in which
the control unit further controls a position at which the suspended utterance of the voice agent is resumed.

(16) The information processing apparatus according to any one of (1) to (15), in which
the interactive information includes at least one of information regarding the utterance of the voice agent or information regarding the interaction between the voice agent and the user.

(17) The information processing apparatus according to any one of (1) to (16), in which
the interactive information includes at least one of utterance waiting information, cumulative interaction time information or agent detailed information regarding the voice agent itself.

(17) The information processing apparatus according to any one of (1) to (17), in which
the interactive information is sent and received with any one of a network, a voice signal superimposed on synthesized voice of the voice agent, or an optical signal as a medium.

(19) The information processing apparatus according to any one of (1) to (18), further including
the voice agent.

(20) An information processing method including:
a receiving step of receiving interactive information regarding another voice agent;
a determination step of determining an utterance timing of a voice agent on the basis of the interactive information received from the another voice agent; and
a sending step of sending the interactive information while the voice agent is uttering or interacting with a user.

REFERENCE SIGNS LIST

100 Voice agent
101 Interactive processing unit

102 Utterance timing control unit
103 Microphone
104 Voice recognition unit
105 Voice synthesis unit
106 Speaker
107 Communication unit
108 Antenna
109 Database
110 Control unit

The invention claimed is:

1. An information processing apparatus, comprising:
a central processing processor (CPU) configured to:
transmit first interactive information from a first voice agent, wherein the first interactive information corresponds to a first schedule of a first notification from the first voice agent;
receive second interactive information from a second voice agent, wherein the second interactive information corresponds to a second schedule of a second notification from the second voice agent;
compare the first schedule of the first notification from the first voice agent with the second schedule of the second notification from the second voice agent;
determine, based on the comparison, an utterance timing for the first voice agent, wherein the utterance timing corresponds to a duration when the first notification from the first voice agent does not overlap with the second notification from the second voice agent; and
control a first output from the first voice agent based on the determined utterance timing for the first voice agent, wherein the first output corresponds to the first notification.

2. The information processing apparatus according to claim 1, wherein the CPU is further configured to receive the second interactive information regarding the second voice agent before the first voice agent starts the first output.

3. The information processing apparatus according to claim 1, wherein the CPU is further configured to control the first output to suspend the first notification from the first voice agent based on the second interactive information received from the second voice agent.

4. The information processing apparatus according to claim 1, wherein the CPU is further configured to control the first output to resume the first notification from the first voice agent based on the second interactive information received from the second voice agent.

5. The information processing apparatus according to claim 1, wherein the CPU is further configured to:
control an interaction between the first voice agent and the second voice agent based on the comparison between the first schedule and the second schedule, wherein the interaction corresponds to determination of a priority order of the first notification and the second notification; and
control the first output from the first voice agent based on the determined utterance timing and the interaction.

6. The information processing apparatus according to claim 1, wherein the CPU is further configured to transmit the first interactive information during the determined utterance timing for the first voice agent and during an interaction between the first voice agent and a user.

7. The information processing apparatus according to claim 1, wherein the CPU is further configured to:
determine whether an interaction between the first voice agent and a user has ended, and
transmit, based on the determination that the interaction has not ended, the first interactive information during the determined utterance timing of the first voice agent.

8. The information processing apparatus according to claim 7, wherein the CPU is further configured to determine whether the interaction between the first voice agent and the user has ended each time utterance of the first voice agent ends.

9. The information processing apparatus according to claim 1, wherein the CPU is further configured to transmit the first interactive information in parallel with reception of the second interactive information.

10. The information processing apparatus according to claim 1, wherein the CPU is further configured to transmit the first interactive information in parallel with the first notification of the first voice agent.

11. The information processing apparatus according to claim 1, wherein the control unit CPU is further configured to control the first output of the first voice agent based on a user input that corresponds to a predetermined word into.

12. The information processing apparatus according to claim 11, wherein the CPU is further configured to control the first output of the first voice agent based on the user input that corresponds to the predetermined word, regardless of whether the second interactive information is received from the second voice agent.

13. The information processing apparatus according to claim 1, wherein the CPU is further configured to control the first output to suspend the first notification from the first voice agent based on the second interactive information that is received from the second voice agent.

14. The information processing apparatus according to claim 1, wherein the CPU is further configured to:
control the second voice agent to suspend the second notification during the determined utterance timing; and
control a second output from the second voice agent based on completion of the determined utterance timing, wherein the second output corresponds to the second notification.

15. The information processing apparatus according to claim 1, wherein the CPU is further configured to control the first output to suspend the first notification from the first voice agent until the second interactive information is no longer received from the second voice agent.

16. The information processing apparatus according to claim 1, wherein the first interactive information includes at least one of information regarding utterance of the first voice agent or information regarding interaction between the first voice agent and a user.

17. The information processing apparatus according to claim 1, wherein the first interactive information further corresponds to at least one of utterance waiting information, cumulative interaction time information, or agent detailed information regarding the first voice agent.

18. The information processing apparatus according to claim 1, wherein the first interactive information is transmitted via a communication network, a voice signal superimposed on synthesized voice of the first voice agent, or an optical signal as a medium.

19. The information processing apparatus according to claim 1, further comprising the first voice agent.

20. An information processing method, comprising:
receiving first interactive information regarding a first voice agent, wherein the first interactive information corresponds to a first schedule of a first notification from the first voice agent;

receiving second interactive information regarding a second voice agent, wherein the second interactive information corresponds to a second schedule of a second notification from the second voice agent;

comparing the first schedule of the first notification from the first voice agent with the second schedule of the second notification from the second voice agent;

determining, based on the comparison, an utterance timing of the first voice agent;

wherein the utterance timing corresponds to a duration when the first notification from the first voice agent does not overlap with the second notification from the second voice agent; and transmitting, based on the determined utterance timing, third interactive information while the first voice agent is uttering or interacting with a user.

21. The method according to claim 20, wherein the third interactive information corresponds to a third schedule of the second notification from the second voice agent, and the third schedule of the second notification does not overlap with the first schedule of the first notification.

* * * * *